US008359691B2

(12) United States Patent
Morris et al.

(10) Patent No.: US 8,359,691 B2
(45) **Date of Patent: *Jan. 29, 2013**

(54) COMPACT FOLDING SLIDE-OUT RAMP ASSEMBLY

(75) Inventors: Don Morris, Conifer, CO (US); Paul Reichmuth, Escalon, CA (US); David Johnson, Modesto, CA (US)

(73) Assignee: Lift-U, Division of Hogan Mfg., Inc., Escalon, CA (US)

( * ) Notice: Subject to any disclaimer, the term of this patent is extended or adjusted under 35 U.S.C. 154(b) by 815 days.

This patent is subject to a terminal disclaimer.

(21) Appl. No.: 12/024,899

(22) Filed: Feb. 1, 2008

(65) Prior Publication Data

US 2008/0187425 A1 Aug. 7, 2008

Related U.S. Application Data

(60) Provisional application No. 60/887,773, filed on Feb. 1, 2007.

(51) Int. Cl.
*E01D 1/00* (2006.01)

(52) U.S. Cl. .................................................. 14/71.3

(58) Field of Classification Search .................. 14/69.5, 14/71.1, 71.3; 414/537, 921; 296/61
See application file for complete search history.

(56) References Cited

U.S. PATENT DOCUMENTS 3,730,361 A * 5/1973 Haynes ......................... 414/537
3,846,860 A 11/1974 Kummerman
3,955,827 A * 5/1976 Wonigar ....................... 280/166
4,068,770 A 1/1978 Boehringer
4,274,172 A 6/1981 Franklin
4,836,736 A 6/1989 Neagu
5,085,555 A 2/1992 Vartanian
5,160,236 A 11/1992 Redding
5,253,410 A 10/1993 Mortenson
5,306,113 A 4/1994 Mann
5,342,105 A 8/1994 Miles
5,391,041 A 2/1995 Stanbury
5,449,267 A 9/1995 Ablabutyan
5,636,399 A 6/1997 Tremblay
5,791,717 A 8/1998 Reich
5,871,329 A 2/1999 Tidrick
6,010,298 A 1/2000 Cohn
6,203,265 B1 3/2001 Cohn
6,210,098 B1 4/2001 Cohn
6,238,168 B1 5/2001 Cohn
6,343,908 B1 2/2002 Oudsten
6,409,458 B1 6/2002 Cohn
6,536,064 B1 3/2003 Swink
6,602,041 B2 8/2003 Lewis
6,647,898 B2 11/2003 Li
6,698,998 B2 3/2004 Koretsky
6,715,177 B1 4/2004 Lagergren-Julander
6,718,886 B2 4/2004 Engle (Continued)

FOREIGN PATENT DOCUMENTS

DE 4413444 A1 10/1995
EP 1447272 A2 8/2004

(Continued)

*Primary Examiner* — Gary S Hartmann

(74) *Attorney, Agent, or Firm* — Christensen O'Connor Johnson Kindness PLLC

(57) ABSTRACT

A ramp assembly includes but is not limited to a frame, a ramp platform functionally associated with the frame, a stow/deploy mechanism for deploying and stowing the ramp platform, and a drive assembly operatively connected to the stow/deploy mechanism for conditionally actuating the stow/deploy mechanism, which in turn, articulates the ramp platform between the stowed and deployed positions.

10 Claims, 15 Drawing Sheets

U.S. PATENT DOCUMENTS

| | | | | |
|---|---|---|---|---|
| 6,802,095 | B1 * | 10/2004 | Whitmarsh et al. | 14/71.3 |
| 6,843,635 | B2 | 1/2005 | Cohn | |
| 6,860,702 | B1 | 3/2005 | Banks | |
| 6,887,028 | B1 | 5/2005 | Kirla, Jr. | |
| 7,001,132 | B2 * | 2/2006 | Koretsky et al. | 414/537 |
| 7,264,433 | B2 | 9/2007 | Navarro | |
| 7,533,432 | B2 | 5/2009 | Morris | |
| 7,533,433 | B2 | 5/2009 | Morris | |
| 7,533,434 | B2 | 5/2009 | Morris | |
| 7,681,272 | B2 | 3/2010 | Morris | |
| 8,020,234 | B2 * | 9/2011 | Johnson et al. | 14/71.3 |
| 8,032,963 | B2 * | 10/2011 | Morris et al. | 14/71.3 |
| 8,122,552 | B2 * | 2/2012 | Morris et al. | 14/71.3 |
| 8,122,553 | B1 * | 2/2012 | Johnson et al. | 14/71.3 |
| 8,132,281 | B1 * | 3/2012 | Johnson et al. | 14/71.3 |
| 8,166,594 | B1 * | 5/2012 | Morris | 14/71.3 |
| 8,181,300 | B1 * | 5/2012 | Johnson et al. | 14/71.3 |
| 8,230,539 | B2 * | 7/2012 | Morris et al. | 14/71.1 |
| 8,234,737 | B2 * | 8/2012 | Morris et al. | 14/71.3 |
| 8,250,693 | B1 * | 8/2012 | Johnson et al. | 14/71.3 |
| 2002/0197141 | A1 | 12/2002 | Cohn | |
| 2003/0007853 | A1 | 1/2003 | Cohn | |
| 2004/0022613 | A1 | 2/2004 | Kellogg | |
| 2004/0096304 | A1 | 5/2004 | Lewis | |
| 2004/0136820 | A1 | 7/2004 | Cohn | |
| 2004/0146385 | A1 | 7/2004 | Edwards | |
| 2006/0245883 | A1 | 11/2006 | Fontaine | |
| 2008/0271267 | A1 | 11/2008 | Morris | |
| 2008/0271268 | A1 | 11/2008 | Johnson | |
| 2008/0271269 | A1 | 11/2008 | Morris | |
| 2009/0271934 | A1 | 11/2009 | Morris | |
| 2012/0030886 | A1 * | 2/2012 | Persson et al. | 14/71.1 |

FOREIGN PATENT DOCUMENTS

| | | | |
|---|---|---|---|
| EP | 1844980 | A2 | 10/2007 |
| GB | 585917 | A | 2/1947 |
| GB | 2116940 | A | 10/1983 |
| GB | 2369344 | A | 5/2002 |
| JP | 07-108867 | A | 4/1995 |
| JP | 2001-239888 | A | 9/2001 |
| JP | 2002-154368 | A | 5/2002 |
| JP | 2008-230270 | A | 10/2008 |
| WO | 03/064208 | A1 | 8/2003 |
| WO | 2005/123450 | A1 | 12/2005 |

* cited by examiner

COMPACT FOLDING SLIDE-OUT RAMP ASSEMBLY

CROSS-REFERENCE TO RELATED APPLICATION

This application claims the benefit of U.S. Provisional Application No. 60/887,773, filed Feb. 1, 2007, the disclosure of which is incorporated herein by reference.

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis in providing systems that assist such a person to access a vehicle, such as a bus, van, or train.

A common manner of providing the physically challenged with access to vehicles is a ramp. Various ramp operating systems for vehicles are known in the art. Some ramps slide out from underneath the floor of the vehicle and tilt down. Others, known as foldout ramps, stow horizontally within a recess in the vehicle floor and pivot upward and outward to a downward-sloping position. Further, others are stowed in a vertical position and are pivoted about a hinge, while still others are supported by boom and cable assemblies.

Ramps on vehicles confront a variety of technical problems. Longer ramps are desirable because the resulting slope is lower, making it more accessible and safer for wheelchair-bound passengers. However, the ramp length is typically limited by the space available in the vehicle. Elements such as vehicle chassis structure, suspension, passenger seats, driver platforms, and fare boxes prohibit longer ramps. As a result the ramp slopes are higher than practical, and although ADA compliant, are unmanageable by the mobility impaired without assistance. So much so, that when a physically challenged passenger attempts to maneuver up a steep ramp without assistance, the passenger risks tipping over and injuring themselves.

In view of the foregoing, there is a need for a compact ramp assembly for a vehicle that when stowed occupies a small amount of space within the vehicle floor, yet deploys to a length that effectively reduces the ramp slope encountered by the mobility impaired, thus facilitating greater independence and safety for wheelchair-bound passengers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present invention, a ramp assembly is provide. The ramp assembly includes a frame and a ramp platform that is associated with the frame and is movable between a stowed position and a deployed position. The ramp platform includes an inner ramp panel, an intermediate ramp panel, and an outer ramp panel. The ramp assembly also includes a stow/deploy mechanism associated with the ramp platform. Movement of the stow/deploy mechanism articulates the ramp platform between the stowed and deployed position. The ramp panels of the ramp assembly are configured and arranged such that: 1) the outboard ramp platform panel is oriented in an opposing position above and parallel to the intermediate ramp panel in the stowed position, and is oriented substantially coplanar to the intermediate ramp panel in the deployed position; 2) the intermediate ramp panel slides with respect to the frame from the stowed to the deployed position; and 3) the inner ramp panel has a downwardly sloping orientation in the stowed and deployed positions.

In accordance with another aspect of the present invention, a ramp assembly is provided. The ramp assembly includes a frame and a ramp platform that is associated with the frame and is movable between a stowed position and a deployed position. The ramp platform includes an inner ramp section, an intermediate ramp section, and an outer ramp section. The ramp platform is movable in a motion pattern when transitioning from the stowed position to the deployed position. The motion pattern includes a first phase, wherein the outer ramp section rotates approximately 180 degrees with respect to the intermediate ramp section and the intermediate ramp section translates with respect to the inner ramp section, and a second phase, wherein the intermediate ramp section translates with respect to the inner ramp section.

In accordance with another aspect of the present invention, a ramp assembly is provided. The ramp assembly includes a support structure and an outer ramp section movable between a stowed position within the support structure and a deployed position in which the outer ramp section is inclined from an inner edge downwardly and outwardly of the support structure. The ramp assembly also includes an inner ramp section having an outer edge in proximity of a lower, outward edge of the support structure and an inner edge in proximity of the upper, inward edge of the support structure. The inner ramp section is mounted on the support structure for pivotal movement about an inward horizontal axis at the inner edge of the inner ramp section. The ramp assembly further includes an intermediate ramp section slideable between a generally horizontal, stowed position and a generally inclined, deployed position. The outer ramp section is mounted for pivotal movement relative to the intermediate ramp section about an outer horizontal axis at the outer edge of the intermediate ramp section. The outer ramp section is movable through an angle of approximately 175 to 185 degrees relative to the intermediate ramp section while moving between the stowed position and the deployed position such that in the stowed position the outer ramp section is inverted and positioned above of the intermediate ramp section. When deployed, the outer ramp section, the intermediate ramp section, and inner ramp section form a common ramp surface inclined outwardly and downwardly from the inner edge of the inner ramp section to the outer edge of the outer ramp section.

DESCRIPTION OF THE DRAWINGS

The foregoing aspects and many of the attendant advantages of this invention will become more readily appreciated by reference to the following detailed description, when taken in conjunction with the accompanying drawings, wherein.

Figure 1:
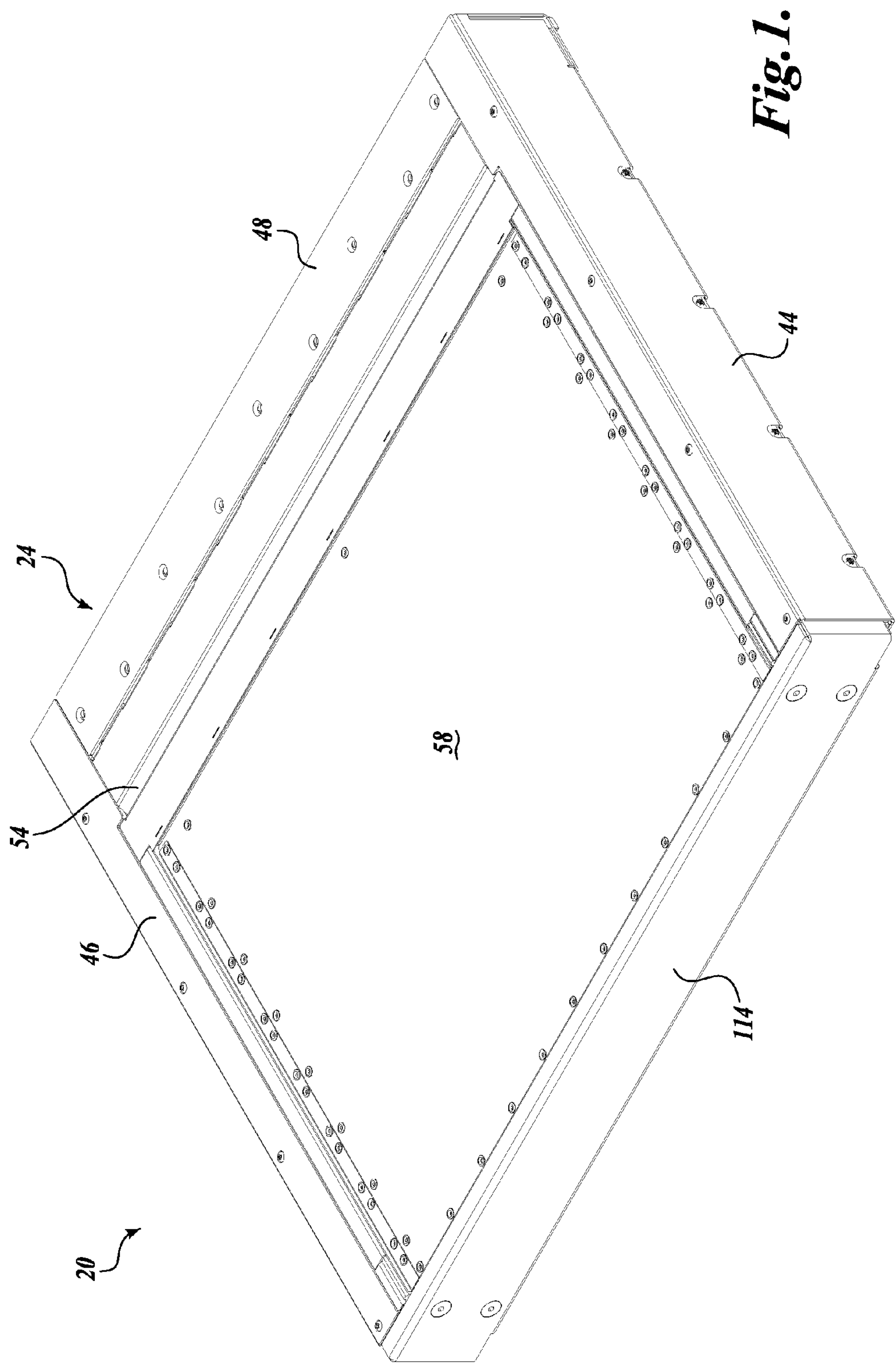
FIG. 1 is a front perspective view of one exemplary embodiment of a ramp assembly shown in the stowed configuration.
Figure 2:
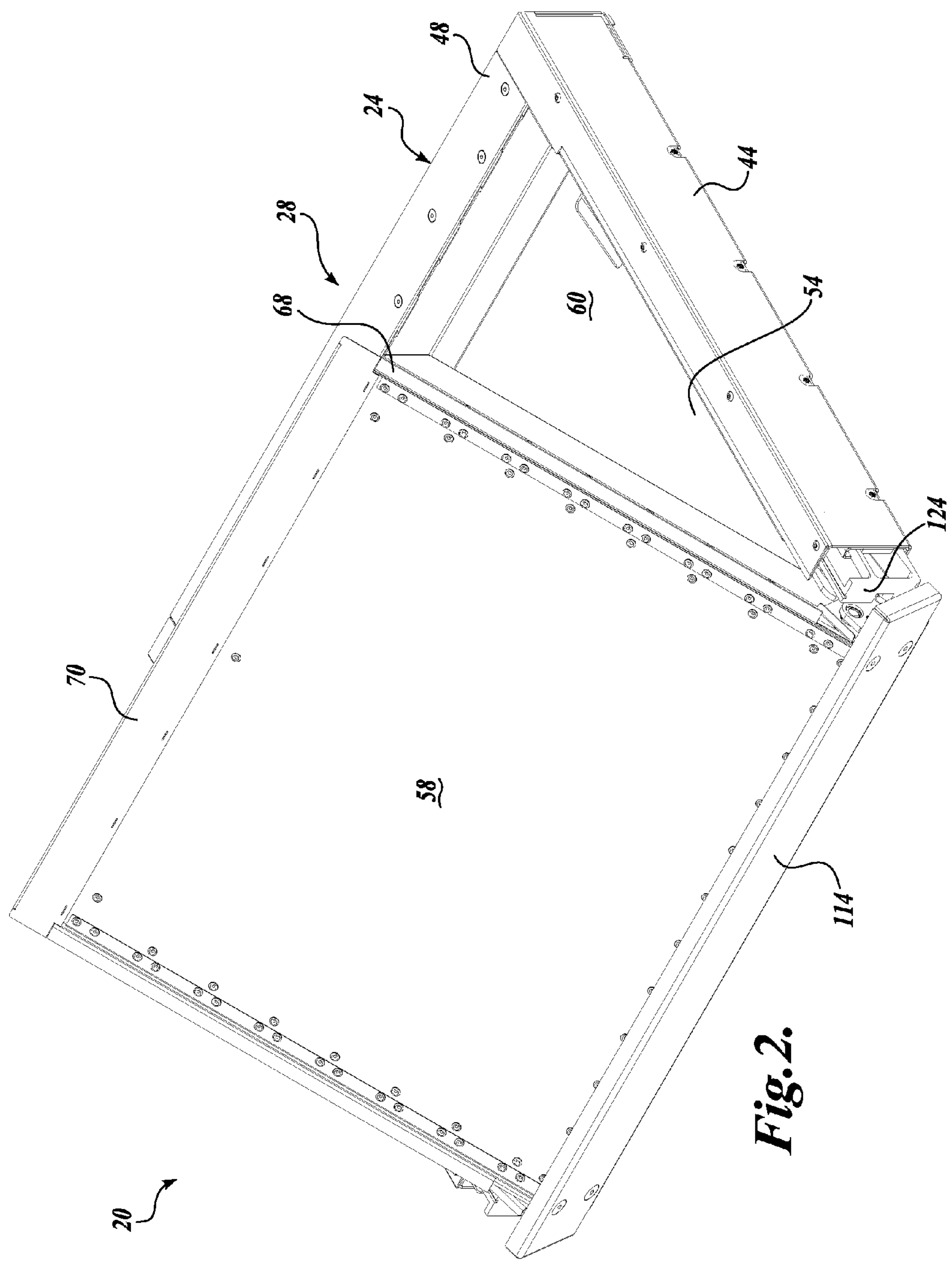
FIGS. 2-4 are sequential front perspective views of one embodiment of the ramp assembly as the ramp platform transitioned from the stowed position of FIG. 1.
Figure 3:
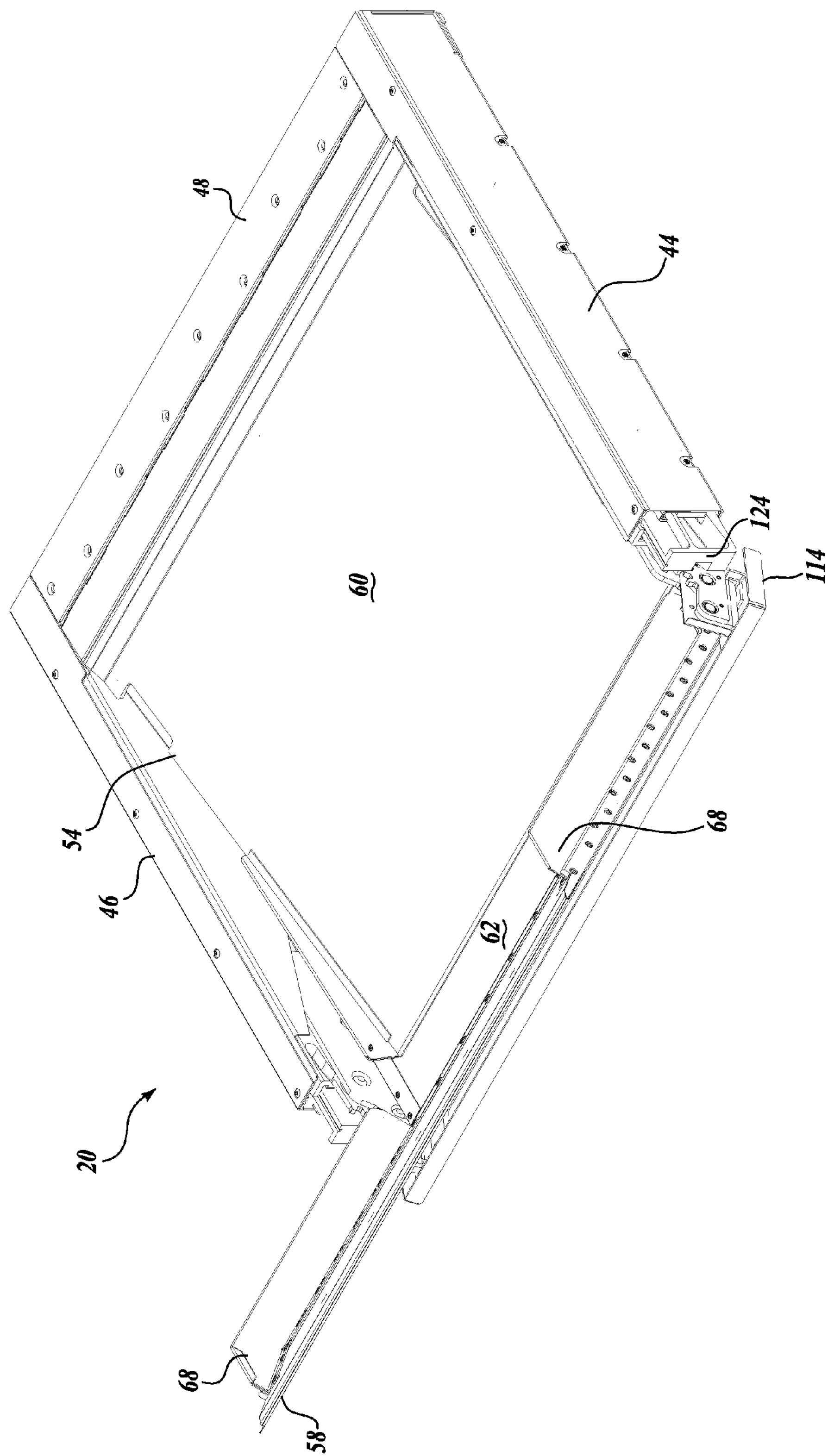
Figure 5:
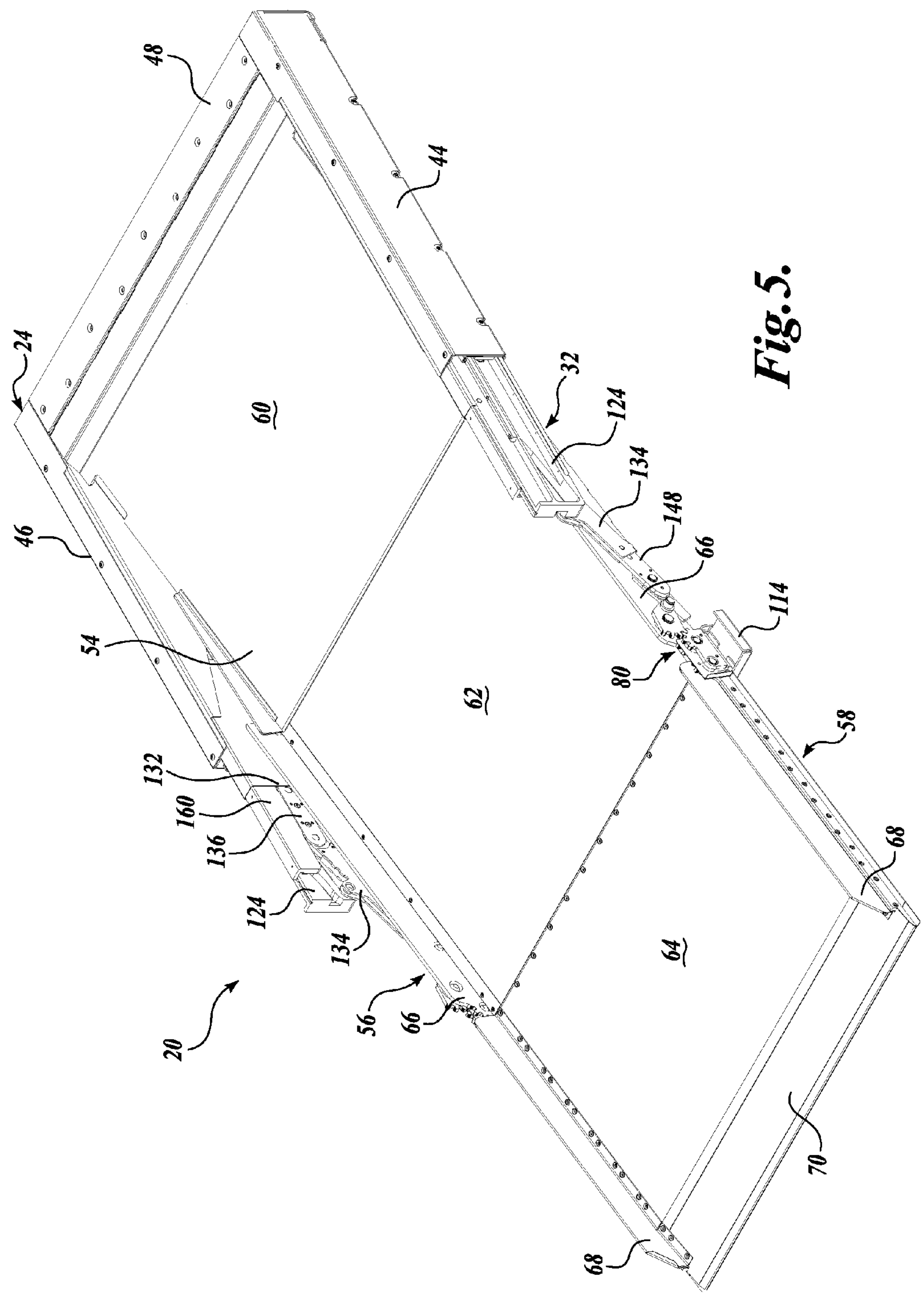
FIG. 5 is a front perspective view of the ramp assembly of FIG. 1 in the fully deployed configuration.
Figure 6:
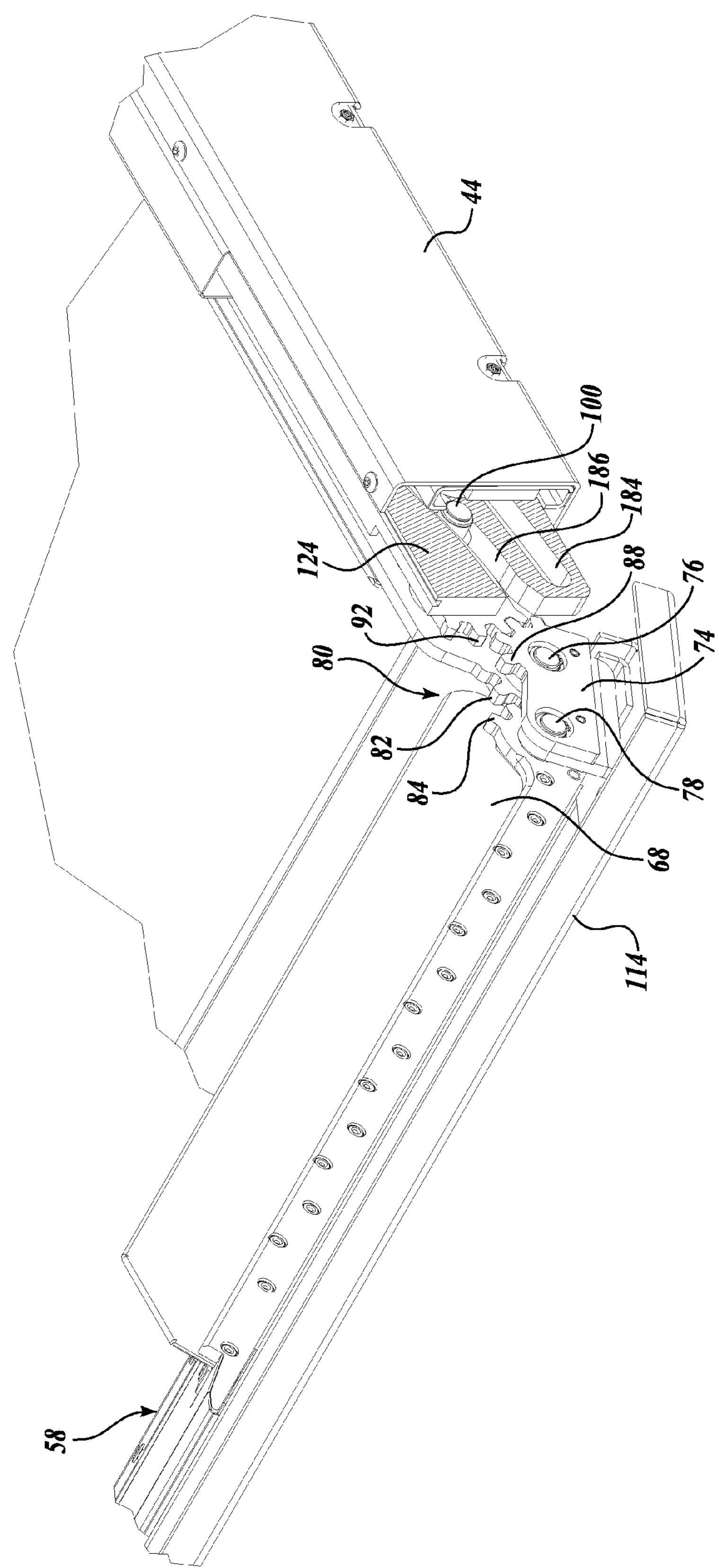
FIG. 6 is an enlarged partial perspective view of the ramp assembly similar to that shown in FIG. 2, wherein the stow/ deploy mechanism has continued to extend, thus unfolding an outboard ramp platform segment of the ramp platform further toward the deployed position.
Figure 7:
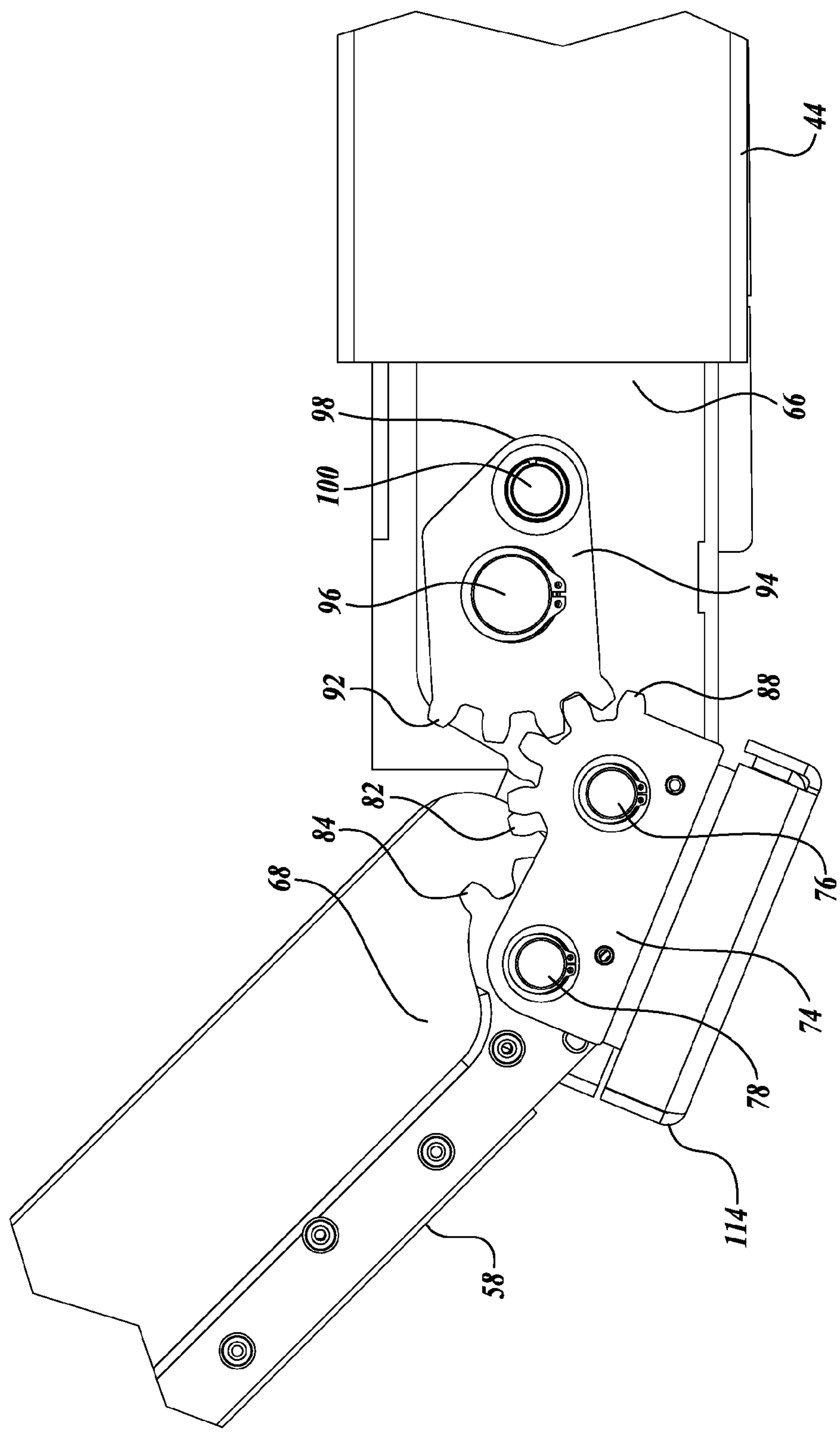
Figure 8:
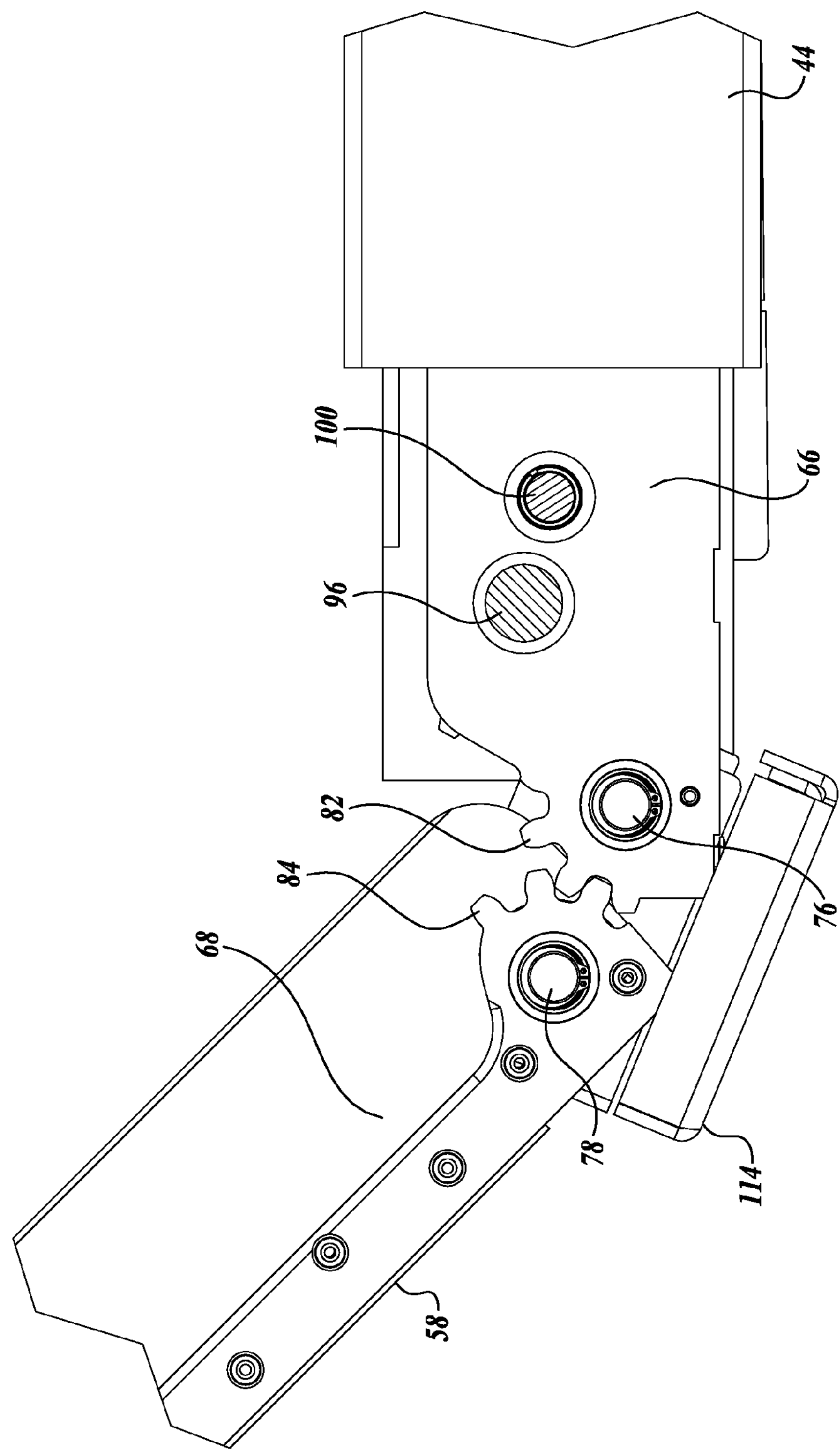
Figure 9:
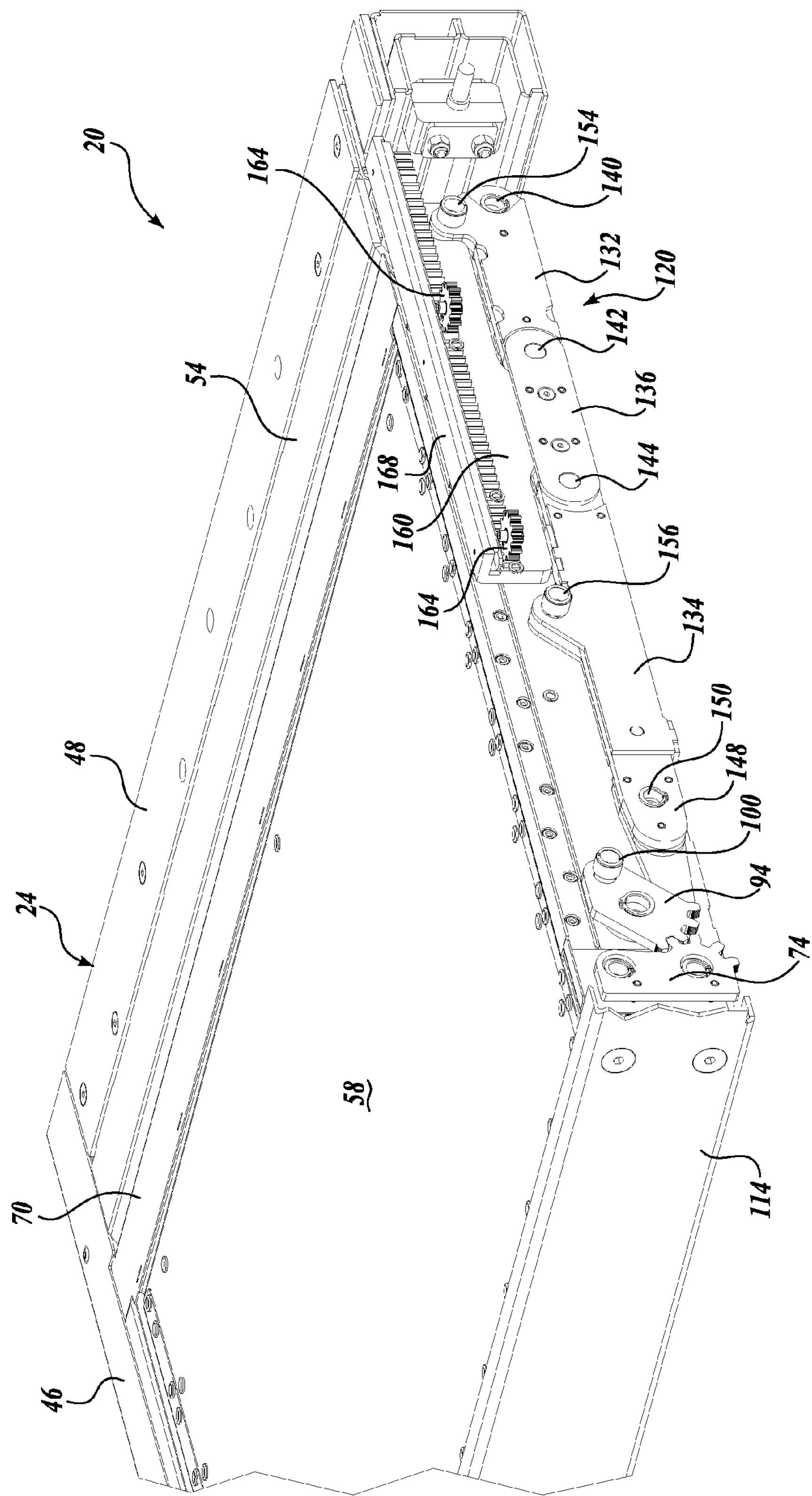
Figure 10:
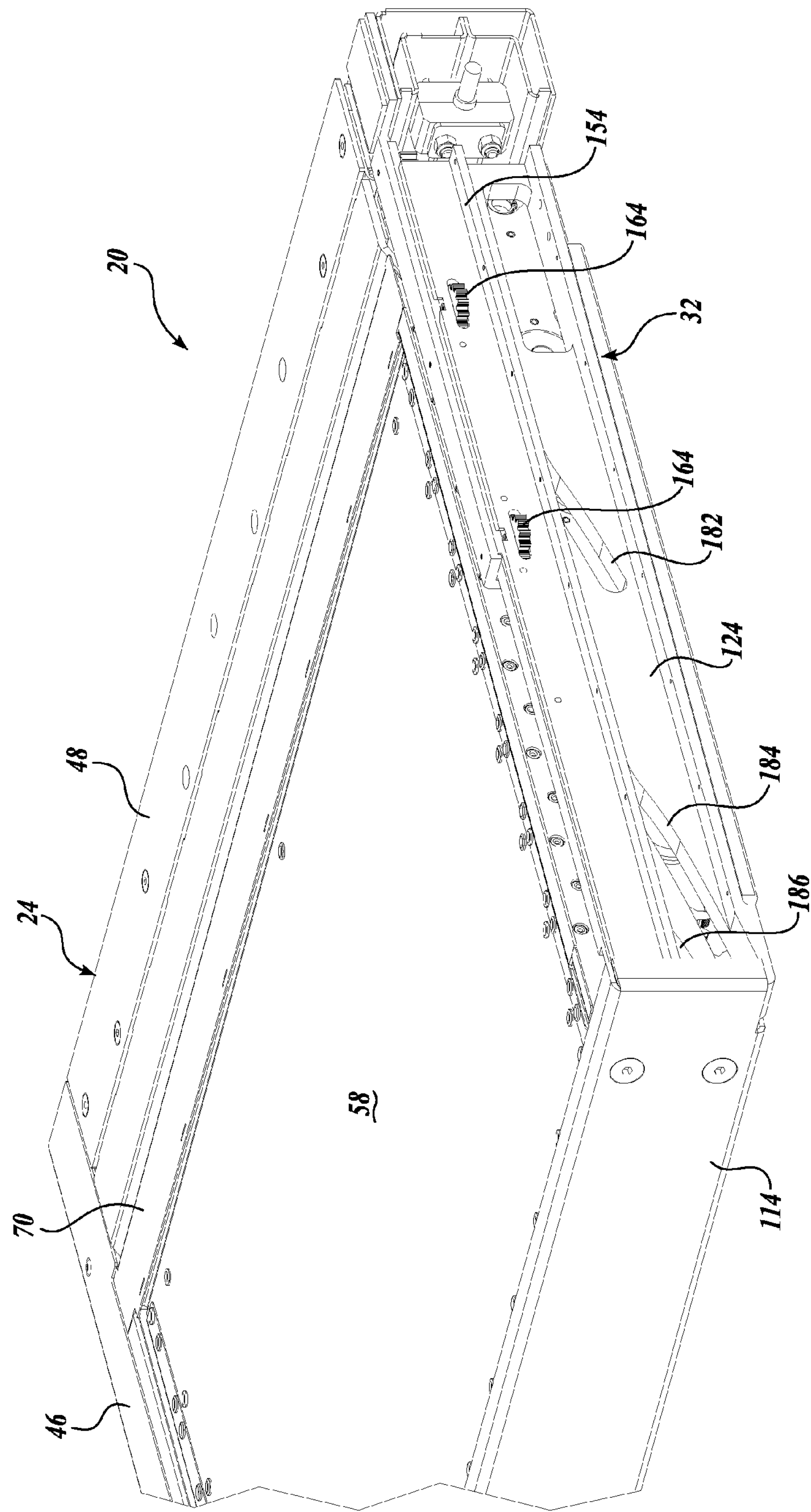
Figure 11A:
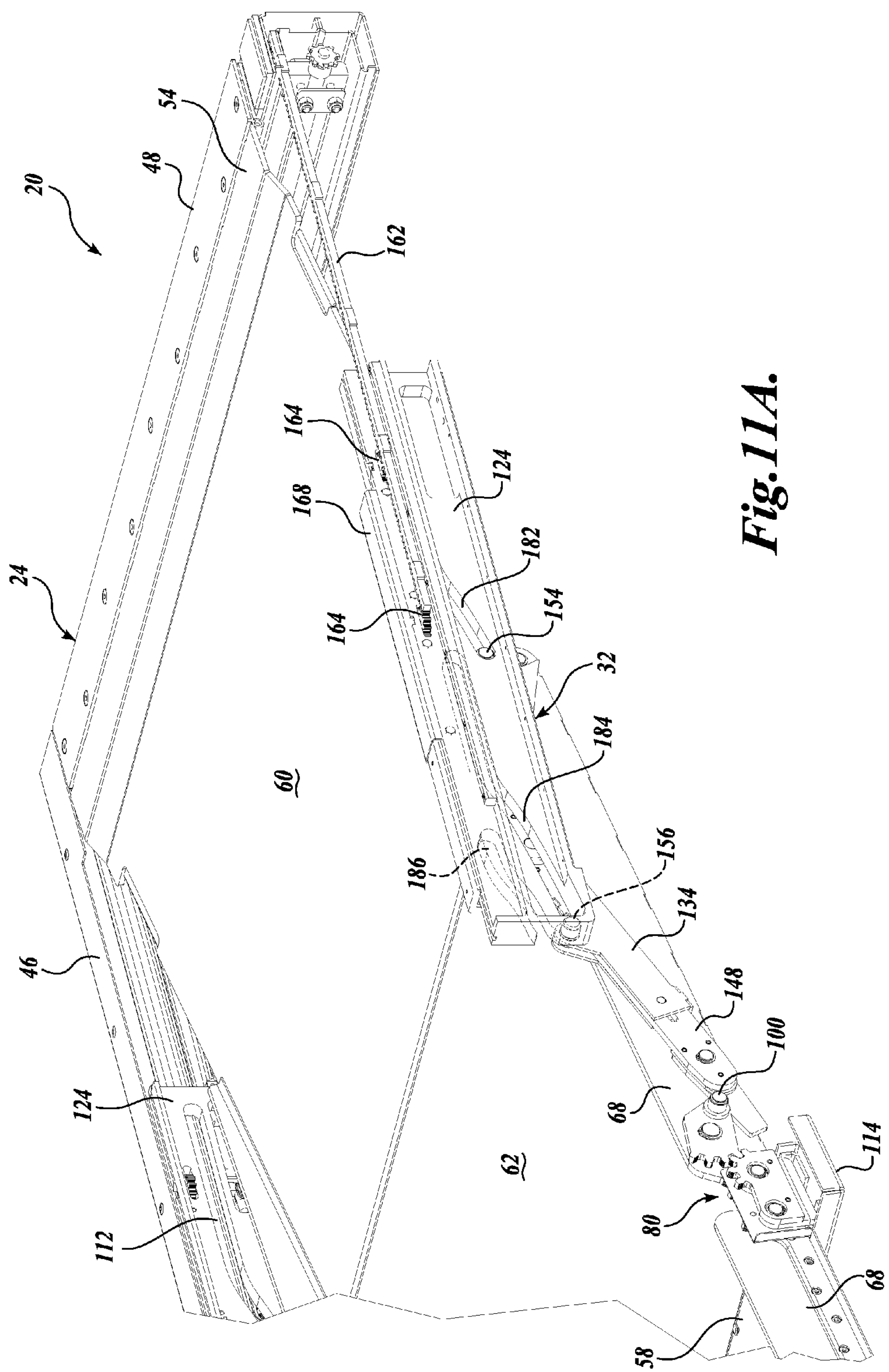
Figure 11B:
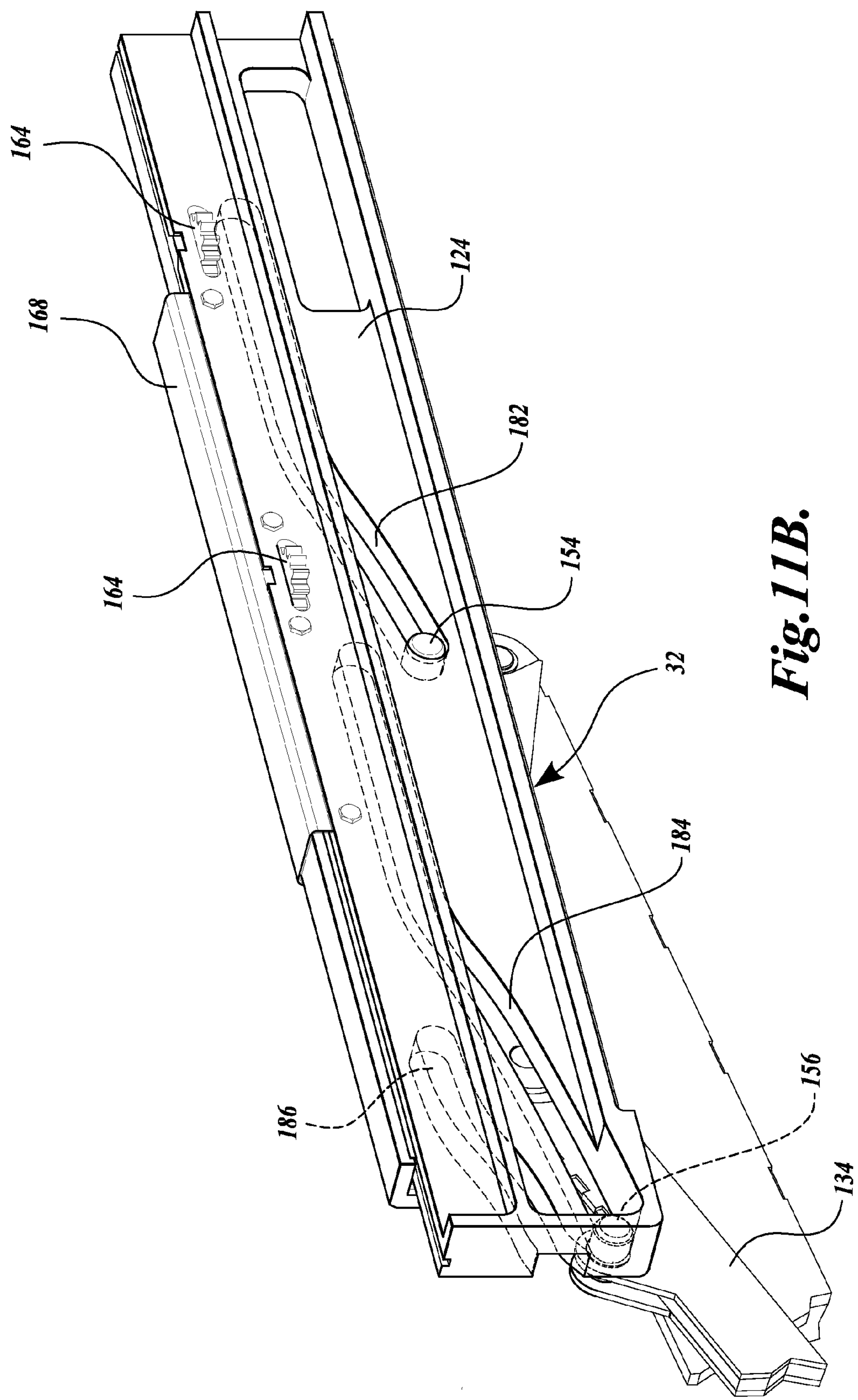
Figure 12:
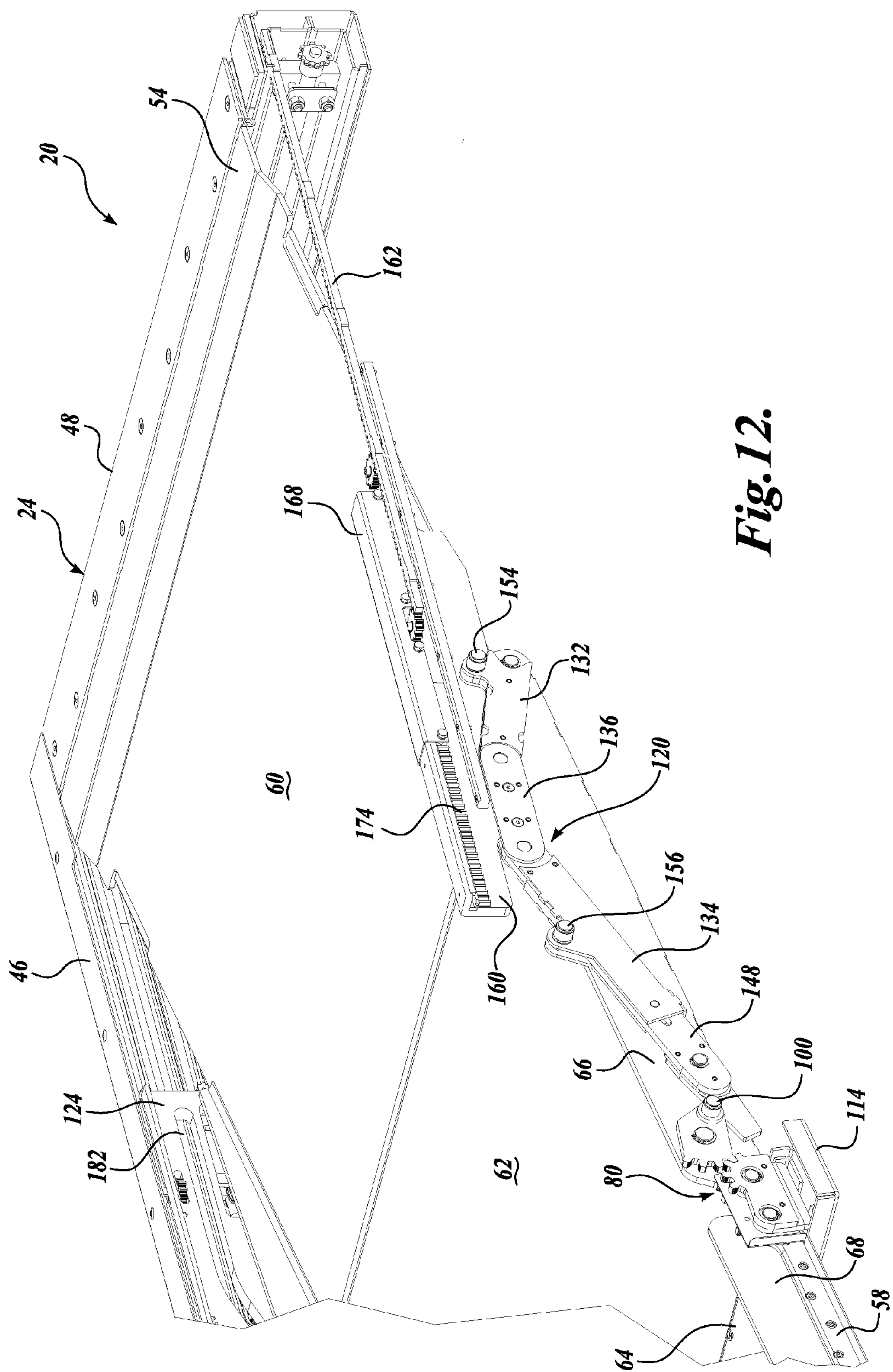
Figure 13:
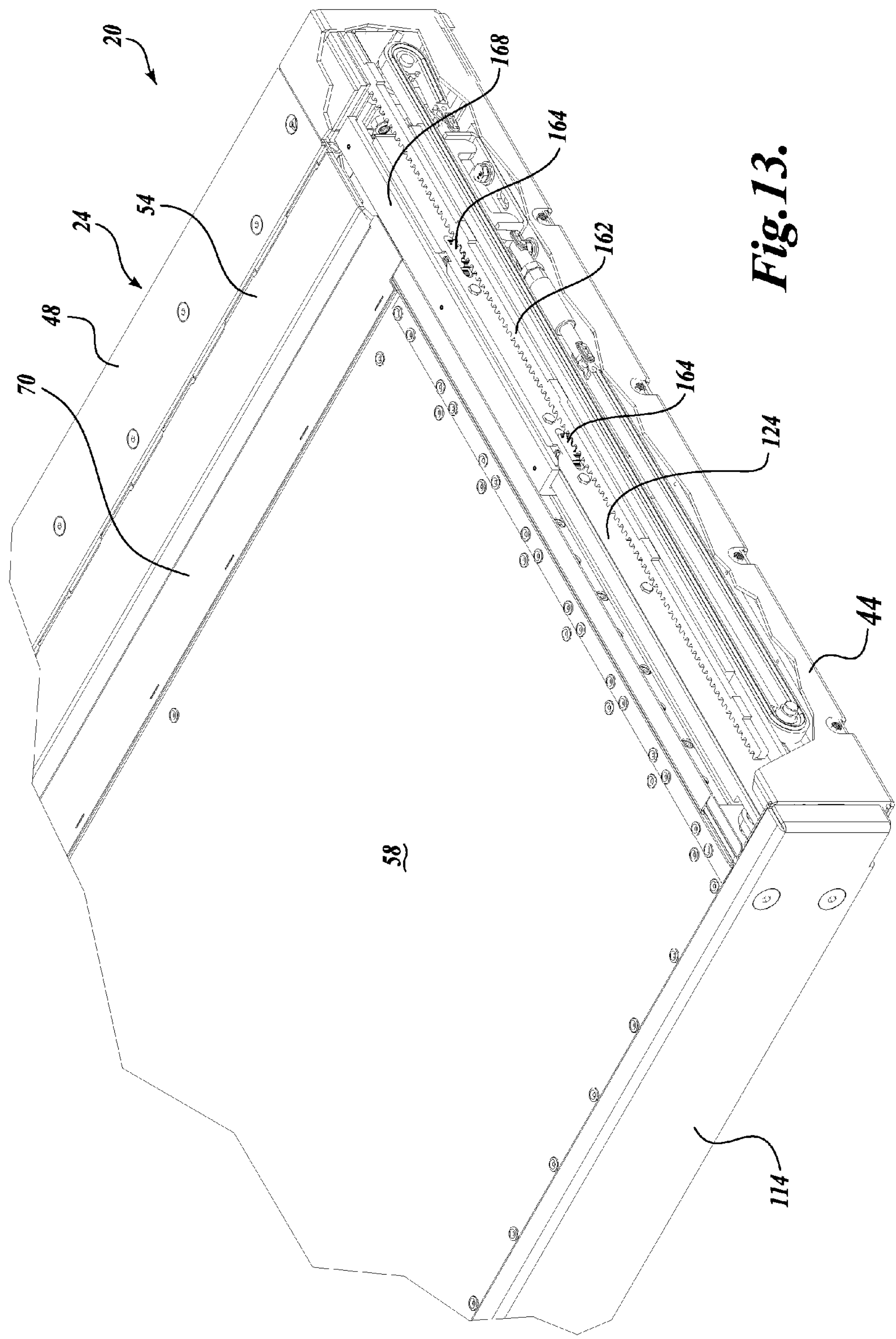
Figure 14:
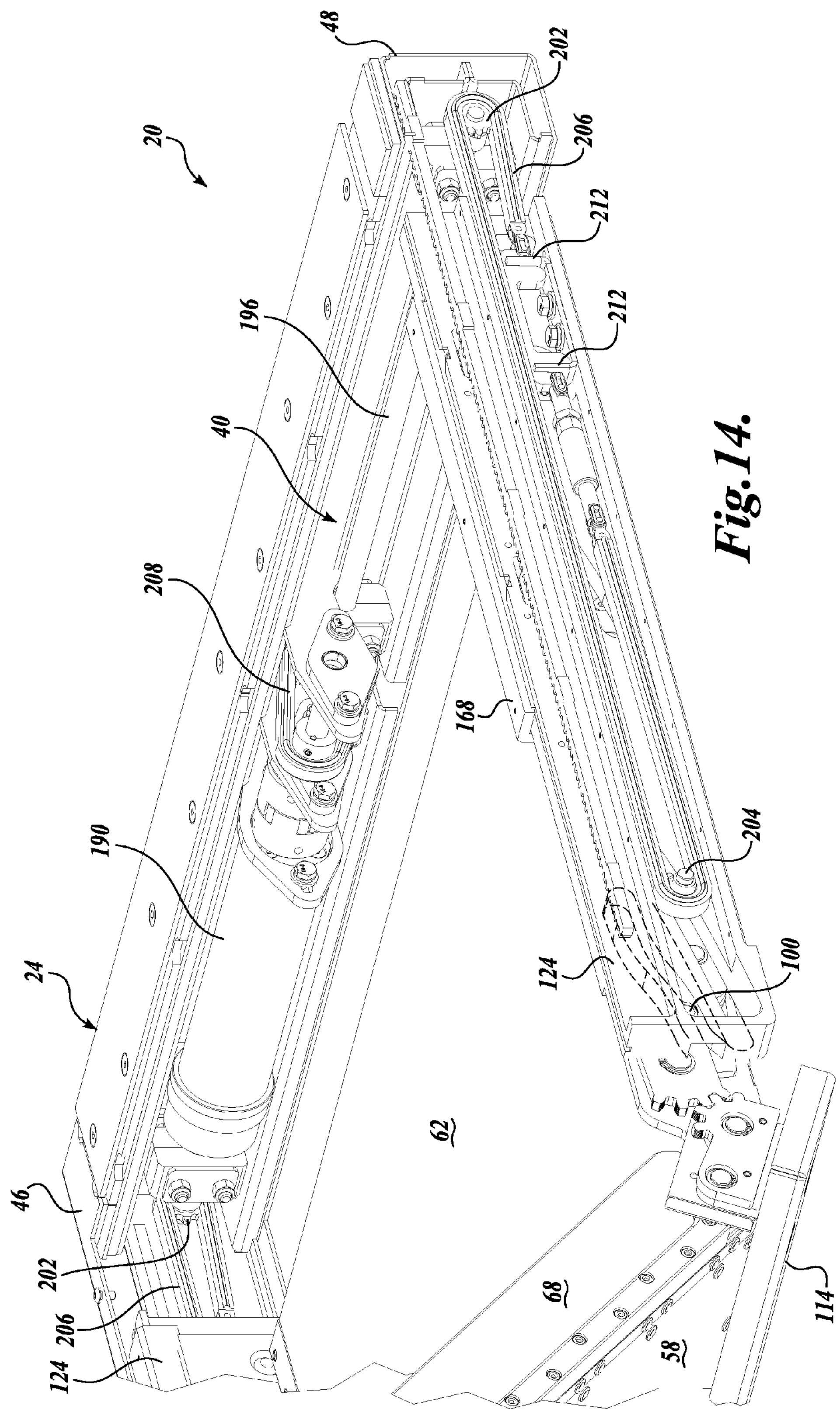

FIG. 7 is a side planar view of the ramp assembly shown in FIG. 6, wherein the sliding member of the exemplary stow/deploy mechanism is not shown in order to reveal other exemplary components, such as a link member and a fold lever having a cam follower, that form one exemplary connection between the outboard ramp platform segment and the intermediate ramp platform segment;

FIG. 8 is a side planar view of the ramp assembly shown in FIG. 7, wherein the fold lever and link member are removed to illustrate an exemplary outboard and inboard timing spur gear engagement between the outboard ramp platform segment and the intermediate ramp platform segment;

FIG. 9 is a partial perspective view of the ramp assembly shown in FIG. 1 with a portion of the frame removed and a sliding member of the exemplary stow/deploy mechanism hidden to reveal components of an exemplary rack and pinion arrangement and a control arm;

FIG. 10 is a perspective view of the ramp assembly illustrated in FIG. 9 with a portion of the frame removed so that the sliding member of the stow/deploy mechanism can be shown;

FIG. 11A is an enlarged partial perspective view of the ramp assembly similar to that shown in FIG. 5, wherein the ramp platform is approaching the fully deployed position, and wherein a portion of the frame is hidden to illustrate the extended sliding member of the stow/deploy mechanism;

FIG. 11B is an enlarged partial perspective view of the sliding member of the stow/deploy mechanism;

FIG. 12 is a perspective view of the ramp assembly shown in FIG. 11A, wherein the sliding member of the exemplary stow/deploy mechanism is hidden to reveal other components of the stow/deploy mechanism, such as a sliding rack, a slide link, and outer and inner control arm segments;

FIG. 13 is an enlarged partial perspective view of the ramp assembly shown in FIG. 1, wherein a portion of the frame and sliding member are partially broken away to reveal an embodiment of a rack and pinion arrangement; and FIG. 14 is a partial perspective view of the ramp assembly similar to that shown in FIG. 2, wherein a portion of the frame and the inboard ramp platform segment is hidden to reveal elements of an exemplary drive assembly.

DETAILED DESCRIPTION

Exemplary embodiments of the present invention will now be described with reference to the accompanying drawings where like numerals correspond to like elements. Exemplary embodiments of the present invention are directed to wheelchair ramp assemblies. In particular, several embodiments of the present invention are directed to wheelchair ramp assemblies suitable for use in buses, vans, trains, etc. In addition, some embodiments of the present invention are directed to compact ramp assemblies for a vehicle that when stowed occupies a small amount of space within the vehicle floor, yet deploys to a length that effectively reduces the ramp slope encountered by the mobility impaired, thus facilitating greater independence and safety for wheelchair-bound passengers.

The following discussion proceeds with reference to examples of wheelchair ramp assemblies for use in vehicles having a floor, such as a bus, van, train, etc. While the examples provided herein have been described with reference to their association with vehicles, it will be apparent to one skilled in the art that this is done for illustrative purposes only and should not be construed as limiting the scope of the invention, as claimed. Thus, it will be apparent to one skilled in the art that aspects of the present invention may be employed with other ramp assemblies used in stationary installations, such as residential buildings and the like. The following detailed description may use illustrative terms such as vertical, horizontal, front, rear, inboard, outboard, proximal, distal, etc. However, these terms are descriptive in nature and should not be construed as limiting. Further, it will be appreciated that embodiments of the present invention may employ any combination of features described herein.

FIGS. 1-5 illustrate one exemplary embodiment of a folding, slide-out ramp assembly, generally designated 20, formed in accordance with aspects of the present invention. As best shown in FIGS. 1-5, the folding, slide-out ramp assembly 20 (hereinafter "ramp assembly 20") includes but is not limited to a frame 24, a ramp platform 28 functionally associated with the frame 24, a stow/deploy mechanism 32 (FIG. 5) for deploying and stowing the ramp platform 28, and a drive assembly 40 (FIG. 14) operatively connected to the stow/deploy mechanism for conditionally actuating the stow/deploy mechanism, which in turn, articulates the ramp platform 28 between the stowed and deployed positions. When installed in a vehicle, embodiments of the ramp assembly 20 in the stowed position may function as the step edge, as well as a portion of the vestibule floor, upon which able-bodied passengers traverse as they enter and exit the vehicle.

Generally described, when a physically disabled passenger wishes to board or deboard a vehicle equipped with the ramp assembly 20, the ramp assembly 20 transitions from the stowed position shown in FIG. 1 wherein the ramp platform 28 is disposed within the frame 24, to the deployed position shown in FIG. 5, wherein the ramp platform 28 extends outwardly from the vehicle, in a downwardly sloping orientation. As will be described in detail below, the ramp platform 28 transitions from the stowed to the deployed position according to a defined motion pattern. Once the passenger has boarded into or deboarded from the vehicle, the operator returns the ramp platform 28 to its stowed position of FIG. 1.

To more fully understand and appreciate the features and aspects of the ramp assembly 20, each of the components of the ramp assembly 20 will now be described in detail. Referring again to FIG. 1, there is shown a front perspective view of the ramp platform 28 folded within the frame 24. The frame 24 includes at least front and rear (in relation to the front or rear of the vehicle in which the assembly is mounted) side walls 44 and 46, and an inboard cross member 48 interconnecting the side walls 44 and 46 at the inboard side, for example, of the vehicle, which together define an open ended cavity for permitting the ramp platform 28 to fold into and unfold out of the frame 24. The frame 24 is generally U-shaped and is suitably dimensioned in one embodiment to be mounted in a floor of an associated vehicle. The components of the frame 24 may include mounting brackets or other similar hardware (not shown), which accept bolts or other fasteners (not shown), for mounting the frame 24 within an associated vehicle.

Turning now to FIGS. 1-5, the ramp platform 28 will be described in more detail. As best shown in FIG. 5, the ramp platform 28 is a multi-segment or multi-panel ramp platform that unfolds (and slides) from its stowed position of FIG. 1 to its deployed position of FIG. 5. In the embodiment shown in FIG. 5, the ramp platform 28 comprises an inboard ramp platform segment 54, an intermediate ramp platform segment 56, and an outboard ramp platform segment 58. The ramp platform segments 54, 56, and 58 are preferably constructed out of metal, such as aluminum or steel of appropriate strength and rigidity, in a generally rectangular configuration having similarly dimensioned length-wise sides and similarly dimensioned width-wise ends. Each ramp platform segment 54, 56, and 58 is formed with a generally planar deck 60, 62, and 64, respectively. The ramp platform segments 56 and 58 further include opposed side walls, known as side curbs 66 and 68, that extend up from the decks 62 and 64, respectively, preferably orthogonal thereto, and extend along the length-wise sides of the ramp platform segments 56 and 58. The outboard ramp platform segment 58 may further include a transition 70 disposed along at least a portion of, and preferably the majority of, the outboard width-wise end of the outboard ramp platform segment 58.

When the ramp assembly 20 is assembled and oriented in the deployed position of FIG. 5, the inboard width wise end of the inboard platform ramp segment 54 is pivotally coupled to the frame 24 near the upper, inboard end thereof and is oriented in a downwardly sloping orientation. The inboard width wise end of the intermediate ramp platform segment 56 is disposed generally horizontally beneath the outboard width wise end of the inboard ramp platform segment 54 in a slidably supporting manner. Further, the outboard width wise end of the intermediate platform ramp segment 56 is positioned adjacent to and pivotally connected to the inboard width wise end of the outboard ramp platform segment 58 in a manner that allows approximately 175-185, and preferably about 180 degrees, of rotational movement between a stowed position, wherein the outboard ramp platform segment 58 is oriented in an opposing position above and generally parallel to the intermediate ramp platform segment 56, and a deployed position, wherein the decks of the ramp platform segments are substantially generally coplanar.

In the embodiment shown in FIGS. 5-8, the intermediate ramp platform segment 56 is pivotally connected to the outboard ramp platform segment 58 via link members 74 (FIGS. 7 and 8) about inboard and outboard pins 76 and 78. The inboard pin 76 rotationally connects the link member 74 to the intermediate ramp platform segment side curbs 66 and the outboard pin 78 rotationally connects the link member 74 to the outboard ramp platform segment side curbs 68. As will be described in more detail below, the connection between the intermediate ramp platform segment 56 and the outboard ramp platform segment 58 may further be configured for providing: 1) synchronous movement of the intermediate and outboard ramp platform segments 56 and 58; and 2) actuation of the outboard ramp platform segment 58 relative to the intermediate ramp platform segment 56 between the stowed and deployed positions.

As was described above, the ramp platform 28 articulates between the stowed position of FIG. 1 and the deployed position of FIG. 5. When the ramp platform 28 is in the stowed position of FIG. 1, the outboard ramp platform segment 58 is oriented near the upper limit of the frame 24 in an opposing position above and generally parallel to the intermediate ramp platform segment 56, and the inboard ramp platform segment 54 is positioned diagonally in the space between the intermediate and outboard ramp platform segments 56 and 58 with its inboard width wise end pivotally connected to the frame 24 and its outboard width wise end slideably supported by the intermediate ramp platform segment 56. When the ramp platform 28 is in the deployed position shown in FIG. 5, the intermediate ramp platform segment 56 is disposed adjacent and outwardly of the inboard ramp platform segment 54 and the outboard ramp platform segment 58 is disposed adjacent and outwardly of the intermediate ramp platform segment 56 in such a manner that their decks 60, 62, and 64 are substantially coplanar in a somewhat downwardly sloping orientation.

As briefly described above, and in accordance with aspects of the present invention, the connection, generally designated 80, between the intermediate ramp platform segment 56 and the outboard ramp platform segment 58 may further be configured for providing the following features: 1) synchronous rotational movement of the intermediate and outboard ramp platform segments 56 and 58; and 2) actuation of the outboard ramp platform segment 58 relative to the intermediate ramp platform segment 56 between the stowed and deployed positions. To that end, in the embodiment best shown in FIGS. 5-8, timing spur gears 82 and 84 (FIG. 8) are provided at or integrally formed by the outboard ends of the intermediate side curbs 66 and the inboard ends of the outboard side curbs 68, respectively. The timing spur gears 82 and 84 are sized and configured to cooperatively mesh as the outboard ramp platform segment 58 rotates with respect to the intermediate ramp platform segment 56, thereby providing synchronous movement therebetween.

In conjunction with the interaction of the timing spur gears 82 and 84, each link member 74 defines a plurality of spur gear teeth 88 having a pitch circle in which the inboard pin 76 is located at its center, as best shown in FIG. 7. The spur gear teeth 88 of the link members 74 cooperatively mesh with spur gear teeth 92 of fold levers 94, which are rotatably coupled about pins 96 to the distal region of the intermediate side curbs 66. The spur gear teeth 92 have a pitch circle in which the pin 96 is located at its center. Each fold lever 94 further includes a projection 98 that extends inwardly from the pin 96 on the side opposite the spur gear teeth 92. A cam follower 100 is mounted to each projection 98 and extends outwardly therefrom. As will be described in more detail below, the cam followers 100 slide within serpentine cam guides defined by the sliding members 124 of the stow/deploy mechanism 32.

In operation, movement of the cam followers 100 through associated cam guides rotate the fold levers 94 about pins 96, which in turn, impart a driving force on the link members 74 to rotate about inboard pins 76 due to the meshing of spur gear teeth 88 and 92. As described above, the link members 74 are rotationally connected to both the intermediate ramp platform segment 56 and the outboard ramp platform segment 58 at inboard and outboard pins 76 and 78, respectively, and as such, the link members 74 maintain a fixed distance therebetween. As the link members 74 rotate about the inboard pins 76, the drive force created thereby causes the timing spur gears 84 to mesh with the timing spur gears 82, which in turn, causes the outboard ramp platform segment 58 to rotate relative to the intermediate ramp platform segment 56 in a synchronous manner.

It will be appreciated that in one embodiment where the pitch circles of the spur gear teeth 88 and 92 are equal, rotation of the fold levers 94 force an equal rotation of the link members 74 through the meshing of the cooperating spur gear teeth 88 and 92 of the link members 74 and the fold levers 94, respectively. This in turn moves the outboard pins 78 through an arc of constant radius around inboard pins 76, which contemporaneously moves the timing spur gears 84 around the timing spur gears 82 in a planetary manner. Therefore, since the pitch circles of the timing spur gears 82 and 84 are equal, while the link members 74 rotate through an angle of approximately 90 degrees, the synchronous action of the outboard timing spur gears 84 meshing with the inboard timing spur gears 82 rotate the outboard ramp platform segment 58 through an angle of approximately 180 degrees relative to the intermediate ramp platform segment 56.

Thus, in operation, in the stowed configuration the ramp deck 64 of the outboard ramp platform segment 58 faces and is parallel to the ramp deck 62 of the intermediate ramp platform segment 56. After about 90 degrees of rotation of the link members 74 and the resultant 180 degrees rotation of the outboard ramp platform segment 58, the ramp decks 64 and 62 of the outboard ramp platform segment 58 and the intermediate ramp platform segment 56 become substantially coplanar. It will be appreciated that due to design tolerances, manufacturing tolerances, etc., the actual rotational range of the outboard amp platform segment with respect to the intermediate ramp platform segment 56 is about 175-185 degrees.

Referring now to FIGS. 1-14, a closeout 114 may be provided, which is operatively connected to the ramp platform 28 through inboard and outboard pins 76 and 78. The closeout 114 is a generally rectangular member that extends the width of the frame 24. The closeout 114 may serve two purposes when the ramp assembly 20 is in the stowed position: 1) the closeout 114 may aesthetically enclose the outboard end of the stowed ramp assembly; and 2) the closeout 114 may be designed to have sufficient strength to function as the step edge nosing. If desired, it will be appreciated that the upper flange surface of the closeout may include a slip resistant treatment.

Returning to FIGS. 1-5, the ramp platform 28 unfolds from its stowed position of FIG. 1 to its deployed position in FIG. 5 by activation of the stow/deploy mechanism 32. In the illustrative embodiment shown in FIGS. 9-13, the stow/deploy mechanism 32 comprises a pair of control arms 120, a pair of sliding members 124 (FIGS. 10 and 11A-11B), and a pair of rack and pinion arrangements 128 interconnecting the control arms 120 and the sliding members 124.

Referring to FIGS. 9 and 12, the control arms 120 are disposed parallel and adjacent to the front and rear side walls 44 and 46 of the frame 24. Since the control arms 120 are substantially identical in construction and operation, for the sake of brevity, only the control arm 120 position adjacent to the front side wall 44 will be described in detail with regard to FIGS. 9 and 12.

As best shown in FIGS. 9 and 12, an exemplary embodiment of the control arm 120 includes an inner control arm member 132, an outer control arm member 134, and a slide link 136. The inboard end of the inner control arm 132 is rotationally coupled about pivot 140 at the inboard end of the to the intermediate platform segment side curb 66. The outboard end of the outer control arm 134 includes an extension link 148, which is rotationally connected about pivot 150 to the outboard end of the intermediate ramp platform segment side curb 66. The extension link 148 is configured to slideably extend and retract within the outer control arm 134 for enabling the arm length of the control arm to vary as the intermediate ramp platform segment 56 is deployed. The slide link 136 is configured to rotationally couple the outboard end of the inner control arm 132 to the inboard end of the outer control arm 134 about pivots 142 and 144, respectively. The inner control arm member 132 and the outer control arm member 134 include inner arm cam follower 154 and outer arm cam follower 156, respectively. As will be described in more detail below with regard to the sliding members, the inner arm cam follower 154 and the outer arm cam follower 156 are sized and positioned to cooperate with cam guides defined by the sliding members 124 for controlling the movement (extension and downward tilting) of the intermediate ramp platform segment 56.

Referring now to FIGS. 9, 12, and 13, one embodiment of the rack and pinion arrangements 128 for interconnecting the control arms 120 and the sliding members 124 will be described in more detail. Since the rack and pinion arrangements 128 are substantially identical in construction and operation, for the sake of brevity, only the rack and pinion arrangement 128 positioned adjacent the front side wall 44 of the frame 24 will now be described. As best shown in FIGS. 9, 10, and 11A-11B, the exemplary rack and pinion arrangement 128 includes a sliding rack 160, a frame rack 162, and one or more pinion gears 164. In order to support and reciprocate the intermediate ramp platform segment 56, the sliding rack 160 is mounted to the slide link 136 of the control arms 120 in a manner that allows the sliding rack 160 and the slide link 136 to reciprocate in unison, linearly outward during ramp deployment. Mounted on top of or integrally formed by the sliding rack 160 for movement therewith is a sliding member guide 168. The sliding member guide 168 is sized and configured to interact with the sliding rack 160 for providing the sliding member with a guided path of travel.

Referring now to FIG. 13, the frame rack 162 of the rack and pinion arrangement 128 is mounted in a stationary manner to the upper section of the front side wall 44 of the frame 24. The frame rack 162 defines teeth 172 that are disposed at substantially the same height as the teeth 174 defined by the sliding rack 160. The one or more pinion gears 164 operatively connect the sliding rack 160 to the frame rack 162. The pinion gears 164 are rotationally connected to the sliding member 124 at a fixed location. The pinion gears 164 define gear teeth that are sized to cooperatively mesh with the teeth 172 and 174 of the frame rack 162 and sliding rack 160, respectively.

In operation, as will be described in more detail below, as the sliding member 124 is moved from its stowed position to its deployed position, the pinion gears 164 are driven along the frame rack 162. This linear motion induces rotation in the pinion gears 164, which in turn, induces linear motion of the sliding rack 160 in an outboard direction. This linear action translates the sliding rack 160, as well as the control arm 120 and the intermediate ramp platform segment 56, outwardly at a velocity equal to twice the relative motion of the sliding member 124 to the frame 24.

As was described above, the pinion gears 164 are rotatably fixed to the sliding member 124 such that movement of the sliding member 124 is transmitted to the sliding rack 160, and in turn, to the intermediate ramp platform segment 56. Turning now to FIGS. 10 and 11A-11B, the sliding members 124 will be described in more detail. Since the sliding members 124 are substantially identical in construction and operation, for the sake of brevity, only the sliding member 124 position adjacent the front side wall 44 will be described. As best shown in FIGS. 10 and 11A-11B, the sliding member 124 is disposed adjacent to the forward side wall 44 of the frame 24 (not shown in FIGS. 10 and 11A-11B). The sliding member 124 is slideably mounted within the ramp assembly 20 in a reciprocating manner so that the sliding member 124 is capable of movement along a path of travel between a stowed position and a deployed position. In the embodiment shown, the upper edge of the sliding member 124 cooperates in a sliding manner with the sliding member guide 168. Similarly, the lower edge of the sliding member 124 may cooperate with structure of the frame 24 such that the sliding member 124 reciprocates along its path of travel in a guided manner.

Still referring to FIGS. 10 and 11A-11B, the sliding member 124 defines first, second, and third cam guides 182, 184, and 186 disposed consecutively from its inboard end to its outboard end. The first and second cam guides 182 and 184 include a generally horizontal inboard portion and a downwardly sloping outboard portion. The third cam guide 186 is disposed at the outboard region of the sliding member 124 and opens at the end thereof. The third cam guide 186 is of a somewhat serpentine configuration. The cam guides 182, 184, and 186 are positioned and configured for cooperating with cam followers 154, 156, and 100, respectively. The cam followers 100, 154, and 156, and cam guides 182, 184, 186 interact to define the motion pattern of the ramp platform. In particular, the cam guides 182 and 184 and the cam followers 154 and 156 control the extension and downward tilting of the intermediate ramp platform segment 56, while the cam guide 186 and the cam follower 100 control the rotational movement of the fold lever 94, which in turn, controls the rotation of the outboard platform ramp segment 58.

In operation, the sliding member 124 reciprocates between a stowed position in which the sliding member 124 is disposed within the frame 24 as best shown in FIGS. 10 and 13 and a deployed position in which the sliding member 124 is extended out of the frame 24 as best shown in FIG. 5. In the stowed position, the cam followers 154, 156, and 100 are positioned at the inboard ends of the cam guides 182, 184, and 186, respectively. In the deployed position, the cam followers 154 and 156 are positioned at the outboard ends of the cam guides 182 and 184, and the cam follower 100 has exited the cam guides 186.

In accordance with aspects of the present invention, the sliding member 124 shown in FIGS. 10 and 11A-11B is configured for effecting rotation of the fold lever 94, the outer control arm 134, and the inner control arm 132 during deployment. The rotation of these three elements acts to first unfold the outboard ramp platform segment 58 while initially maintaining the intermediate ramp platform segment 56 in a substantially horizontal position as it slides with respect to the inboard ramp platform segment 54. After the outboard ramp platform segment 58 is deployed to a position substantially coplanar with the intermediate ramp platform segment 56, the sliding rack 160 and slide link 136 continue to move outward relative to the sliding member 124. As the inner arm cam follower 154 and the outer arm cam follower 156 continue to move along their respective cam guides 182 and 184, the inner control arm 132 and the outer control arm 134 are synchronously rotated, resulting in the downward tilting of the substantially coplanar intermediate and outboard ramp platform segments 56 and 58, as best shown in FIG. 5.

In accordance with one aspect of the present invention, the interface between the extension link 148 and the outer control arm 134 may be designed to support the downward load of the intermediate ramp platform segment 56 while being compliant if conversely loaded in the upward direction. This allows the intermediate ramp platform segment 56 to comply with changes in the vehicle floor height during and after deployment of the ramp platform. Without this feature in the design, the cam followers could be subject to damage should the vehicle floor lower after the ramp platform was deployed. In an alternate embodiment, the sliding members 124 may be configured such that the cam followers would be permitted to float upward in oversized cam guides allowing compliance in a similar fashion.

As was described in detail above, the sliding members 124 are reciprocally mounted within the frame 24 for moving the ramp platform between its stowed position shown in FIG. 1 and a deployed position shown in FIG. 5. The sliding members 124 may be actuated for movement with respect to the frame 24 by a drive assembly 40. The drive assembly 40 may employ a drive source coupled to an appropriate transmission for moving the sliding members 124 in a reciprocating manner. In the embodiment shown in FIG. 14, the drive assembly 40 includes an electric drive motor 190 as the drive source and a suitable arrangement of a drive shaft 196, a primary chain 206 and associated sprockets (hidden in FIG. 14), and a secondary chain 208 and associated sprockets 202 and 204 for the transmission.

As best shown in the embodiment of FIG. 14, the drive motor 190 is mounted to the frame's inboard cross member 48. The drive shaft 196 is disposed within the frame 24, near the inboard end, and supported by bearings (not shown). The drive motor 190 is coupled to the drive shaft 196 with the secondary chain 208 and associated sprockets. The inboard ends of the primary chain 206 are coupled to drive sprockets 202 disposed on each end of the drive shaft 196. The outboard ends of the primary chains 206 are then coupled to idler sprockets 204 that rotate about fixed pins that are fastened to each side of the frame (front and rear side walls). Each primary chain 206 is securely attached to its respective sliding member 124 with a chain bracket 212, such that when the drive motor 190 is activated and rotates the drive shaft 196, the primary chains 206 synchronously reciprocate the sliding members 124. The chain brackets 212 may be securely connected to the sliding members 124 via removable fasteners, such as bolts/nuts, or may be permanently welded thereto.

In one embodiment of the present invention, the drive motor 190 may further include a brake (not shown). The brake is spring applied and electrically released. When power is removed from the drive motor 190, the brake is applied, which prevents the drive motor and related transmission elements from rotating. The brake locks the unfolded ramp platform 28 in position at any point during the deployment phase when either the operator releases the control switch (not shown), or more importantly when the partially deployed ramp platform contacts the sidewalk or ground and activates the deployed sensor/switch (not shown). The combination brake and deployed sensor/switch facilitates a variable deploy distance influenced by sidewalk or ground elevation variables relative to the vehicle floor from which the ramp was deployed. In addition, the brake locks the ramp in the stowed position. The brake also includes a manual release device (not shown), which enables the ramp to be manually operated in the event of power failure.

It will be appreciated that the drive assembly 40 may use other transmissions, such as pulley/cable arrangements, rack/pinion arrangements, or belt drives, or combinations thereof in combination with an electrical or mechanical motor. Other drive sources may alternatively be used to move the sliding members 124 between the stowed and deployed position, such as hydraulic or pneumatic actuators that receive and exhaust pressurized liquid or gas received by a motorized pump/valve arrangement. The drive assembly 40 is conventionally connected to and controlled by a control system (not shown).

The ramp assembly 20 is preferably electrically powered and controlled. The control system (not shown) includes switches/sensors to indicate ramp position, and operator control switches to selectively activate deployment and stowage of the ramp platform 28. The control system may further include a variable speed motor controller, which enables the initial deployment to be controlled at a slower rate of speed until the outboard ramp unfolds 180 degrees, after which the deployment speed is increased.

The operation of the illustrated embodiments of the ramp assembly 20 will now be described with reference to FIGS. 1-14. During standard operation of the bus, van, train, or other vehicle on which the ramp assembly 20 is mounted, the ramp assembly 20 is maintained in its stowed position (see FIG. 1). When mounted in a vehicle, the stowed ramp assembly 20 may function as the step edge, as well as a portion of the vestibule floor, upon which able-bodied passengers traverse as they enter and exit the vehicle. In several embodiments, the outboard ramp platform segment 58 may be either passively or actively latched in the stowed position during vehicle movement for preventing lifting or bouncing of the outboard ramp platform segment 58 during the high g-forces encountered on the roadways.

When the vehicle stops in order to load/unload a wheelchair or other disabled passenger onto/off of the vehicle, the ramp assembly 20 moves as follows. The operator signals the control system through a standard control panel having a plurality of control switches to actuate the drive assembly 40, which in turn, moves the ramp platform 28 from the stowed position shown in FIG. 1 to the deployed position shown in FIG. 5. Although this and the subsequent description below refer primarily to ramp deployment, it should be obvious that stowage of the ramp assembly 20 operates in a reciprocal manner.

Describing the operation in more detail, the drive assembly 40 is activated to deploy the ramp platform 28 from the stowed position. In the stowed position shown in FIG. 1, the components of the ramp assembly 20 are in the follow positions: the stow/deploy mechanism 32 is retracted into the frame 24; the intermediate ramp platform segment 56 is engaged and supported within the stow/deploy mechanism 32 and oriented in a substantially horizontal position near the lower limit of the frame 24; the outboard ramp platform segment 58 is oriented in an opposing position above and parallel to the intermediate ramp platform segment 56 near the upper limit of the frame 24; the inboard ramp platform segment 54 is positioned diagonally in the space between the intermediate and outboard ramp platform segments 56 and 58; and the cam followers 154, 156, and 100 are positioned at the inboard ends of the their respective cam guides 182, 184, and 186 (hidden in FIG. 10).

Upon activation of the drive assembly 40, the sliding members 124 of the stow/deploy mechanism 32 begin to extend laterally outwardly from the inboard end of the frame 24, which in turn, causes the intermediate ramp platform segment 56 to translate outwardly in a slideably supporting manner under the sloping inboard ramp platform segment 54. In one embodiment, this initial movement of the intermediate ramp platform segment 56 causes the outboard ramp platform segment 58 to be passively withdrawn and disengaged from an optional latching element (not shown). As the sliding members 124 translate outwardly, the intermediate ramp platform segment 56 extends at a distance ratio of 2:1 in relation to the sliding members 124 due to the rack and pinion arrangement 128. Since the intermediate ramp platform segment 56 (and the outboard ramp platform segment 58) translates outwardly in this manner, the cam followers 154, 156, and 100, which are coupled to components of the intermediate ramp platform segment 56, travel along their respective cam guides 182, 184, and 186.

In particular, as the intermediate ramp platform segment 56 moves outwardly with respect to the sliding members 124, the fold lever cam followers 100 travel within the serpentine cam guides 186 (See FIGS. 6, 11B, and 14), which in turn, causes the fold levers 94 to rotate about pins 96. Rotation of the fold levers 94 provides the driving force to rotate the link members 74, which in turn, causes the outboard ramp platform segment 58 to rotate upwardly and outwardly about axes defined by the inboard pins 76 in a synchronous manner until the outboard ramp platform segment deck 64, which was previously opposing the intermediate ramp platform segment deck 62, is extended outward approximately 180 degrees and becomes substantially coplanar with the intermediate ramp platform segment deck 62 (See FIGS. 2-4 and 11A-11B).

Figure 4:
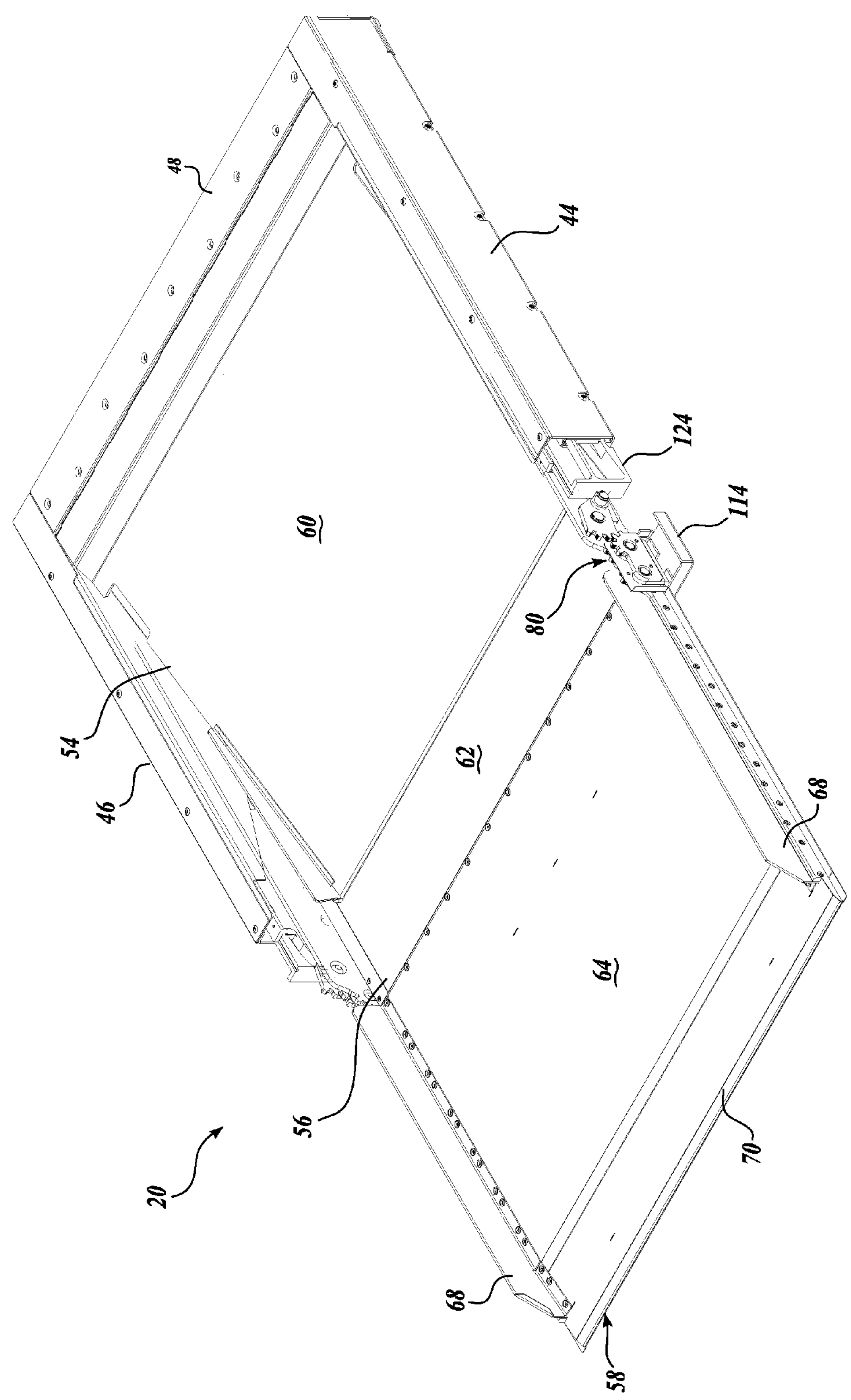

Next, from the position of FIG. 4, the intermediate ramp platform segment 56 continues to slide outwardly as the sliding members 124 translate to a deployed position. During this continued translation, the intermediate ramp platform segment 56 is supported and controlled by the inner arm and outer arm cam followers 154 and 156 of the control arms 120, which travel within cam guides 182 and 184, respectively. As the inner arm cam followers 154 and the outer arm cam followers 156 travel along their respective cam guides 182 and 184, the inner control arms 132 and the outer control arms 134 are synchronously rotated, resulting in the downward tilting of the substantially coplanar intermediate and outboard ramp platforms segments 56 and 58 (See FIG. 5). The intermediate and outboard ramp platform segments 56 and 58 articulate angularly downward until the outboard end of the outboard ramp platform segment 58 comes to rest on the sidewalk or ground.

Once the passenger has boarded the vehicle, the operator returns the ramp platform 28 to the stowed position of FIG. 5 in a manner reciprocal to that described above.

While several exemplary embodiments of the present invention has been illustrated and described, it will be appreciated that various changes can be made therein without departing from the spirit and scope of the invention. For example, an alternate embodiment may include sliding members, wherein the cam guides are configured such that during the initial deployment as the intermediate ramp extends laterally, it is also influenced to rise vertically a predetermined distance without upsetting its horizontal attitude. Synchronous to this action the outboard ramp unfolds 180 degrees, after which the cam guides angle downward causing the coplanar outboard ramp and intermediate ramp to tilt downward, as described previously in the preferred embodiment. The advantage of this feature enables a ramp assembly installed in a vehicle having a lower floor elevation to deploy above a sidewalk elevation that would otherwise interfere with and prevent ramp deployment.

The embodiments of the invention in which an exclusive property or privilege is claimed are defined as follows:

1. A ramp assembly, comprising:

a frame;

a ramp platform associated with the frame and movable between a stowed position and a deployed position, the ramp platform including an inner ramp panel, an intermediate ramp panel, and an outer ramp panel; and a stow/deploy mechanism associated with the ramp platform, the stow/deploy mechanism movable for articulating the ramp platform between the stowed and deployed positions;

wherein the ramp panels are configured and arranged such that (1) the outer ramp panel is oriented in an opposing position above and parallel to the intermediate ramp panel in the stowed position, and is oriented substantially coplanar to the intermediate ramp panel in the deployed position; (2) the intermediate ramp panel slides with respect to the frame from the stowed to the deployed position; and (3) the inner ramp panel has a downwardly sloping orientation in the stowed and deployed positions, and the intermediate ramp panel slidingly supports an outboard end of the inner ramp panel, the inner ramp panel being hingedly coupled to the frame and being positioned above the intermediate ramp panel in the stowed position.

2. The ramp assembly of claim 1, wherein the stow/deploy mechanism linearly reciprocates as the ramp platform transitions between the stowed and deployed positions.

3. The ramp assembly of claim 1, further comprising a drive assembly conditionally operated for effecting movement of the stow/deploy mechanism, thereby articulating the ramp platform between the stowed and deployed positions.

4. The ramp assembly of claim 1, wherein the drive assembly includes an electric motor and a transmission.

5. The ramp assembly of claim 1, wherein the outer ramp panel is connected to the intermediate ramp panel in a manner as to provide synchronous pivoting motion therebetween.

6. The ramp assembly of claim 5, further comprising cooperating gears for providing the synchronous pivoting motion.

7. The ramp assembly of claim 1, wherein the stow/deploy mechanism further comprises first and second support arms that support the ramp platform as the ramp platform moves from the stowed position to the deployed position.

8. The ramp assembly of claim 1, further comprising a guiding mechanism for guiding the movement of the stow/deploy mechanism between the stowed and deployed positions.

9. A ramp assembly, comprising:

a frame;

a ramp platform associated with the frame and movable between a stowed position and a deployed position, the ramp platform including an inner ramp panel, an intermediate ramp panel, and an outer ramp panel; and a stow/deploy mechanism associated with the ramp platform, the stow/deploy mechanism movable for articulating the ramp platform between the stowed and deployed positions, wherein the stow/deploy mechanism includes:

first and second sliding members disposed on the sides of the ramp platform, the sliding members defining cam guides that interact with cam followers mounted on the ramp platform; and rack and pinion arrangements interconnecting the intermediate ramp panel and the sliding members;

wherein the ramp panels are configured and arranged such that (1) the outer ramp panel is oriented in an opposing position above and parallel to the intermediate ramp panel in the stowed position, and is oriented substantially coplanar to the intermediate ramp panel in the deployed position; (2) the intermediate ramp panel slides with respect to the frame from the stowed to the deployed position; and (3) the inner ramp panel has a downwardly sloping orientation in the stowed and deployed positions.

10. The ramp assembly of claim 9, wherein the stow/deploy mechanism further comprises first and second control arms that are configured to allow the ramp panels to pivot relative to the frame.

* * * * *